(12) United States Patent
Yamamoto

(10) Patent No.: US 8,873,016 B2
(45) Date of Patent: Oct. 28, 2014

(54) METHOD FOR MANUFACTURING LIQUID CRYSTAL DISPLAY DEVICE AND LIQUID CRYSTAL DISPLAY DEVICE

(75) Inventor: Takashi Yamamoto, Chiba (JP)

(73) Assignee: Japan Display Inc., Tokyo (JP)

(*) Notice: Subject to any disclaimer, the term of this patent is extended or adjusted under 35 U.S.C. 154(b) by 57 days.

(21) Appl. No.: 13/424,570

(22) Filed: Mar. 20, 2012

(65) Prior Publication Data

US 2012/0242945 A1    Sep. 27, 2012

(30) Foreign Application Priority Data

Mar. 22, 2011 (JP) ................................ 2011-063329

(51) Int. Cl.
*G02F 1/1339*    (2006.01)
*G02F 1/1333*    (2006.01)
*G02F 1/1341*    (2006.01)

(52) U.S. Cl.
CPC ........ *G02F 1/1339* (2013.01); *G02F 1/133351* (2013.01); *G02F 2001/13415* (2013.01)
USPC .......................................... 349/153; 349/155

(58) Field of Classification Search
CPC ..................................................... G02F 1/0107
See application file for complete search history.

(56) References Cited

U.S. PATENT DOCUMENTS

| 7,034,914 | B1* | 4/2006 | Lee et al. | 349/153 |
| 7,522,251 | B2 | 4/2009 | Hirai et al. | |
| 2004/0239864 | A1* | 12/2004 | Asakawa | 349/153 |
| 2005/0128418 | A1* | 6/2005 | Jung et al. | 349/153 |
| 2005/0151919 | A1* | 7/2005 | Lee et al. | 349/153 |
| 2007/0195256 | A1* | 8/2007 | Lee et al. | 349/153 |
| 2008/0024699 | A1* | 1/2008 | Nomura et al. | 349/155 |
| 2008/0266509 | A1 | 10/2008 | Nishi et al. | |
| 2008/0273158 | A1* | 11/2008 | Jung et al. | 349/153 |
| 2009/0066903 | A1* | 3/2009 | Yoshida et al. | 349/153 |
| 2009/0207370 | A1 | 8/2009 | Tsuchiya et al. | |
| 2010/0068965 | A1* | 3/2010 | Kim et al. | 445/24 |
| 2010/0134747 | A1* | 6/2010 | Tashiro et al. | 349/153 |

FOREIGN PATENT DOCUMENTS

| CN | 101363987 | 2/2009 |
| JP | 2001-183681 | 7/2001 |
| JP | 2005-196164 | 7/2005 |
| JP | 2006-184382 | 7/2006 |
| JP | 2007-226227 | 9/2007 |
| JP | 2008-151982 | 7/2008 |
| JP | 2008-286996 | 11/2008 |

* cited by examiner

*Primary Examiner* — Bumsuk Won
*Assistant Examiner* — Ryan Crockett
(74) *Attorney, Agent, or Firm* — Antonelli, Terry, Stout & Kraus, LLP.

(57) ABSTRACT

A method for manufacturing a liquid crystal display device by applying a sealant using a dispenser to form plural seal patterns on a first substrate in a matrix, dropping liquid crystal, bonding a second substrate to the first substrate, and then cutting into individual liquid crystal display devices. A process of forming the seal patterns in a matrix includes (1) a first step of sequentially applying a sealant to one long side and one short side out of four sides of a seal pattern of each liquid crystal display device with a single stroke, and (2) a second step of sequentially applying the sealant to the remaining long side and the remaining short side out of the four sides of the seal pattern of each liquid crystal display device with a single stroke.

11 Claims, 6 Drawing Sheets

(a) AFTER DRAWING    (b) AFTER BONDING (a) AFTER DRAWING    (b) AFTER BONDING

R=2.0mm

NON-CROSSING PORTION
23

22
CROSSING PORTION

METHOD FOR MANUFACTURING LIQUID CRYSTAL DISPLAY DEVICE AND LIQUID CRYSTAL DISPLAY DEVICE

CLAIM OF PRIORITY

The present application claims priority from Japanese patent application JP2011-063329 filed on Mar. 22, 2011, the content of which is hereby incorporated by reference into this application.

BACKGROUND OF THE INVENTION

1. Field of the Invention

The present invention relates to a method for manufacturing a liquid crystal display device and a liquid crystal display device. In particular, the invention relates to a method for manufacturing a liquid crystal display device by which when applying a sealant using a dispenser, an improved pattern shape of the sealant is obtained.

2. Description of the Related Art

Liquid crystal displays are flat and lightweight and thus have been used as displays having various sizes from those of small cellular phones to those of large televisions. The liquid crystal display device of a liquid crystal display includes a first substrate (TFT substrate), a second substrate (counter substrate), a sealant for bonding the first and second substrates together, and liquid crystal sealed in the liquid crystal sealing area enclosed by the first and second substrates and the sealant.

Methods for forming a sealant in the manufacture of liquid crystal display devices include a method of applying a sealant using a dispenser and a method of forming a sealant by printing such as screen printing. Among methods for sealing liquid crystal is a method of forming a liquid crystal injection hole on a portion of a sealant, injecting liquid crystal from the liquid crystal injection hole, and then sealing the liquid crystal injection hole. Another method is the one drop fill method (hereafter referred to as "ODF method") by which liquid crystal is sealed by forming a sealant into a loop having a closed perimeter (e.g., a rough rectangle) without forming a liquid crystal injection hole on the sealant, dropping liquid crystal within this loop, and then bonding first and second substrates together. Further, in the manufacture of liquid crystal display devices, multiple-device cutout is performed where multiple liquid crystal display devices are formed on a mother substrate side by side and then the mother substrate is cut into individual liquid crystal display devices.

FIG. 8 is a plan view showing an example of a pattern formed by conventional sealant application using a dispenser which is described in Japanese Patent Application Laid-Open Publication No. 2008-151982 as the related art. In FIG. 8, a loop SL1 and an extension SL2 are formed using a sealant with a single stroke by allowing a dispenser to travel along a trajectory TR. In sealing liquid crystal using the ODF method, liquid crystal is dropped onto a liquid crystal sealing area LCA enclosed by the loop SL1.

Japanese Patent Application Laid-Open Publication No. 2001-183681 discloses a liquid crystal display device ultraviolet-curable seal pattern formation process including: injecting an ultraviolet-curable sealant using a dispenser in such a manner that an ultraviolet-curable seal pattern line where multiple ultraviolet-curable seal pattern are connected is formed with a single stroke from an edge of a transparent electrode substrate from another edge using a position a predetermined length away from a liquid crystal injection hole as a start point; and then similarly sequentially forming ultraviolet-curable seal patterns in a direction perpendicular to the formation direction of the ultraviolet-curable seal pattern line at predetermined pitches.

SUMMARY OF THE INVENTION

FIG. 9 shows a conventional ODF dispenser-type seal drawing method. A sealant 3 for multiple liquid crystal display devices 1 is applied to a mother glass substrate 2 with a single stroke in a drawing order shown by a dotted arrow. After liquid crystal is sealed, the mother glass substrate 2 is cut into the individual liquid crystal display devices 1.

However, the conventional seal drawing method forms remnants 5 between liquid crystal device sections 4 when cutting the mother glass substrate 1 into the individual liquid crystal display devices 1. This results in a reduction in the yield of the liquid crystal display device. (In the pattern of FIG. 8, a portion representing the width d of the extension SL2 of the sealant corresponds to remnants.) An advantage of the present invention is to prevent formation of remnants and improve the yield of the liquid crystal display device in a dispenser-type seal drawing method.

According to a first aspect of the present invention, in a method for manufacturing a liquid crystal display device by applying a sealant using a dispenser to form plural seal patterns on a first substrate in a matrix, dropping liquid crystal, bonding a second substrate to the first substrate, and then cutting into individual liquid crystal display devices, a process of forming the seal patterns in a matrix includes: a first step of sequentially applying the sealant to one long side and one short side out of four sides of the seal pattern of each liquid crystal display device with a single stroke; and a second step of sequentially applying the sealant to the remaining long side and the remaining short side out of the four sides of the seal pattern of each liquid crystal display device with a single stroke.

In the method for manufacturing a liquid crystal display device according to the first aspect of the present invention, the sealant may be applied in such a manner that the sealant applied in the first step and the sealant applied in the second step cross each other at boundaries between the liquid crystal display devices.

According to a second aspect of the present invention, in a liquid crystal display device manufactured by applying a sealant using a dispenser to form plural seal patterns on a first substrate in a matrix, dropping liquid crystal, bonding a second substrate to the first substrate, and then cutting into individual liquid crystal display devices, the seal patterns on the first substrate includes: a first seal pattern formed by sequentially applying the sealant to one long side and one short side out of four sides of the seal pattern of each liquid crystal display device with a single stroke; and a second seal pattern formed by sequentially applying the sealant to the remaining long side and the remaining short side out of the four sides of the seal pattern of each liquid crystal display device with a single stroke. The first seal pattern and the second seal pattern cross each other at boundaries between the liquid crystal display devices.

In the liquid crystal display device according to the second aspect of the present invention, a radius of curvature of each of the seal patterns adjacent to a crossing portion where the first and second seal patterns cross each other may be larger than a radius of curvature of each of the seal patterns adjacent to a non-crossing portion where the first and second seal patterns do not cross each other.

In the liquid crystal display device according to the second aspect of the present invention, a spacer may be disposed at a crossing portion where the first and second seal patterns cross each other.

In the liquid crystal display device according to the second aspect of the present invention, the spacer disposed at the crossing portion may be in the shape of a rectangular parallelepiped.

In the liquid crystal display device according to the second aspect of the present invention, the spacer disposed at the crossing portion may include plural arranged cylindrical spacers.

According to the aspects of the present invention, it is possible to form four side full just cut liquid crystal display devices, increase the yield of the liquid crystal display device, and contribute to reductions in the cost of the liquid crystal display device.

DETAILED DESCRIPTION OF THE INVENTION

Figure 1A:
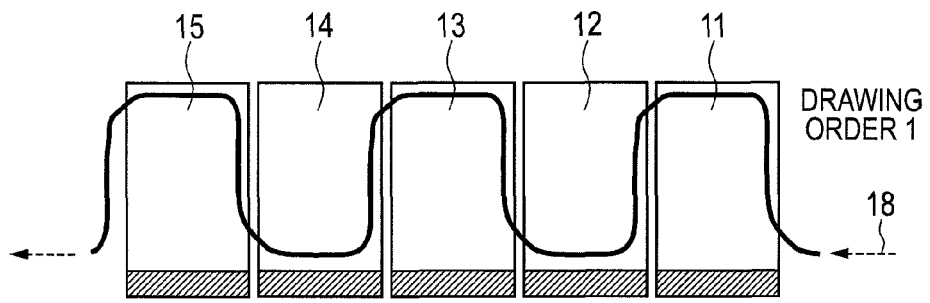
FIG. 1A is a drawing showing an example of a dispenser-type seal drawing method according to the present invention and shows a seal drawn in a drawing order 1.

An embodiment of the present invention will be described with reference to the accompanying drawings. In the drawings, same or similar elements are given same numerals and will not repeatedly be described.

Figure 1B:
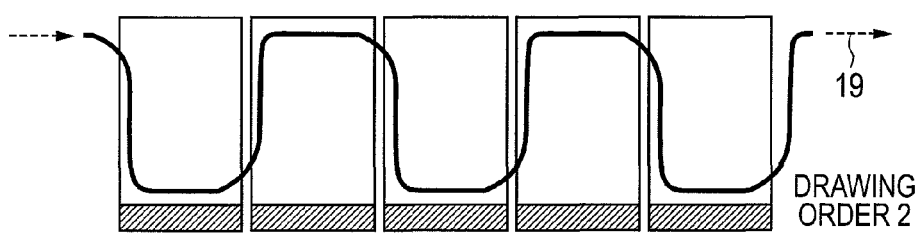
FIG. 1B is a drawing showing an example of a dispenser-type seal drawing method according to the present invention and shows a seal drawn in a drawing order 2.
Figure 1C:
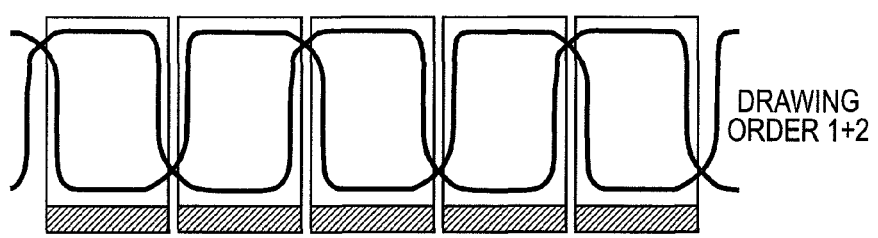
FIG. 1C is a drawing showing an example of a dispenser-type seal drawing method according to the present invention and shows the shape of the seal formed in the drawing orders 1 and 2.

FIGS. 1A to 1C show an example of a dispenser-type seal drawing method according to an embodiment of the present invention. FIGS. 1A to 1C show some (five) liquid crystal display devices on a mother glass substrate, and each of numerals 11 to 15 represents a single liquid crystal display device. FIG. 1A shows a seal drawn in a drawing order 1(18), FIG. 1B shows a seal drawn in a drawing order 2(19), and FIG. 10 shows the shape of the seal drawn on the mother glass substrate in the drawing orders 1 and 2.

Herein, the vertical sides of the liquid crystal display devices 11 to 15 are referred to as "long sides," the right sides of the long sides as "first long sides," and the left sides thereof as "second long sides." Similarly, the horizontal sides of the liquid crystal display devices are referred to as "short sides," the top sides of the short sides as "first short sides," and the bottom sides thereof as "second short sides."

In FIG. 1A, a sealant is applied from the right in the drawing order 1(18) with a single stroke using a dispenser. Specifically, the sealant is applied, first, to the first long side and the first short side of the first liquid crystal display device 11 and, then, to the first long side and the second short side of the second liquid crystal display device 12. Similarly, the sealant is applied to either long sides and either short sides of the third liquid crystal display device 13 and the fourth liquid crystal display device 14. In FIG. 1B, the sealant is applied from the left in the drawing order 2(19) with a single stroke. Specifically, the sealant is applied, first, to the second long side and the second short side of the fifth liquid crystal display device 15 and, then, to the second long side and the first short side of the fourth liquid crystal display device 14. As seen, the sealant is applied to the other long sides and the other short sides to which the sealant has not been applied in the drawing order 1(18). The sealant applied in the drawing order 1 of FIG. 1A and the sealant applied in the drawing order 2 of FIG. 1B form rectangular seal patterns having closed four sides on the liquid crystal display devices 11 to 15 as shown in FIG. 1C.

Alternatively, in the drawing order 1, the sealant may be applied, first, to the second short side and the second long side of the first liquid crystal display device 11 and, then, to the first short side and the second long side of the second liquid crystal display device 12 and, in the drawing order 2, the sealant may be applied to the remaining short sides and long sides to which the sealant has not been applied in the drawing order 1.

After the seal patterns having closed four sides are formed on the mother glass substrate, liquid crystal is filled by, for example, dropping the liquid crystal on the mother glass substrate by the ODF method and then a counter substrate is bonded thereto.

Figure 2:
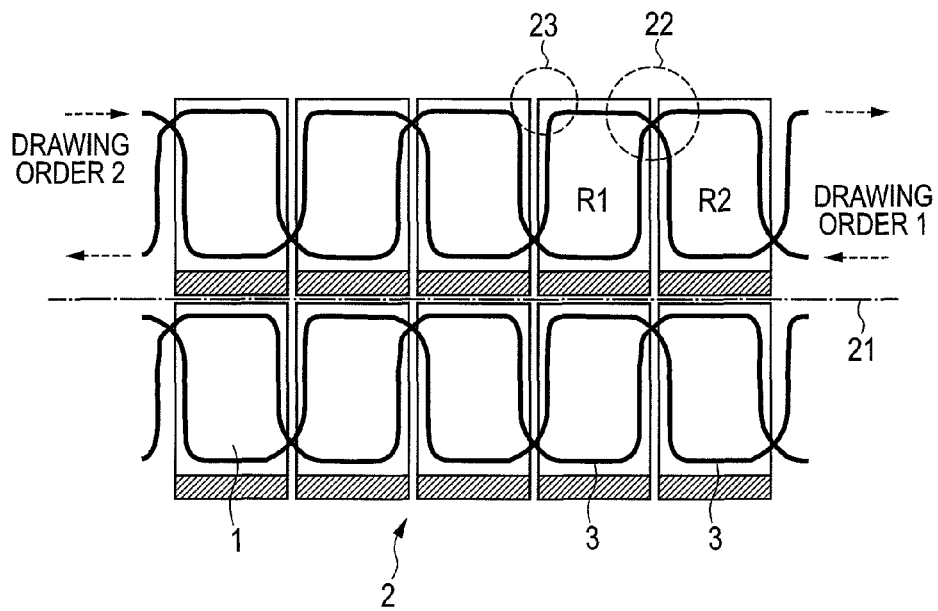
FIG. 2 is a drawing showing some of multiple liquid crystal display devices formed according to an embodiment of the present invention.

FIG. 2 shows some (two rows, five columns) of multiple liquid crystal display devices formed on the mother glass substrate. The mother glass substrate 1 having the counter substrate bonded thereto is cut into individual liquid crystal display devices, for example, as shown by a cutting line 21 of FIG. 2.

Figure 9:
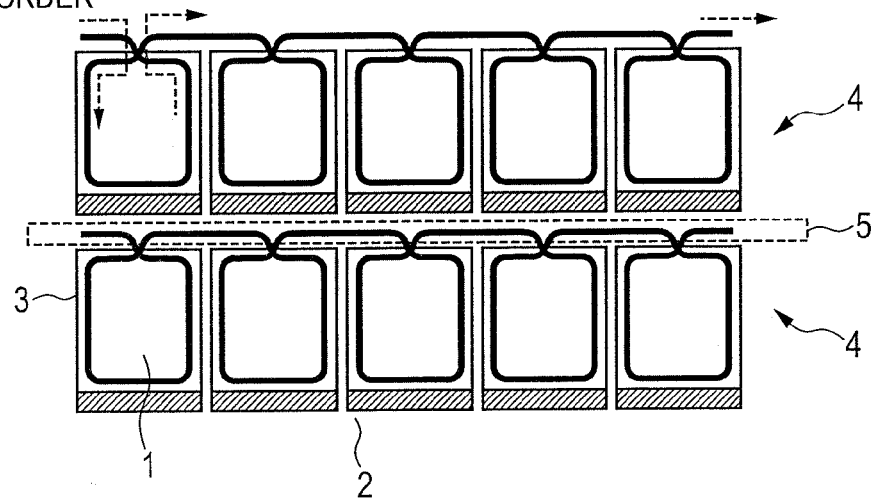
FIG. 9 is a drawing showing a conventional dispenser-type seal drawing method.

As shown in FIG. 2, the seal drawing method according to an embodiment of the present invention allows formation of four-side full just cut liquid crystal display devices without forming remnants 5 unlike the traditional drawing method shown in FIG. 9. As a result, the yield of the liquid crystal display device with respect to the mother glass substrate is improved.

As shown in FIG. 2, the sealant applied in the drawing order 1 and the sealant applied in the drawing order 2 cross each other at the boundaries between the liquid crystal display devices. The R shape of the seal varies between a crossing portion 22 and a non-crossing portion 23 thereof.

Figure 3:
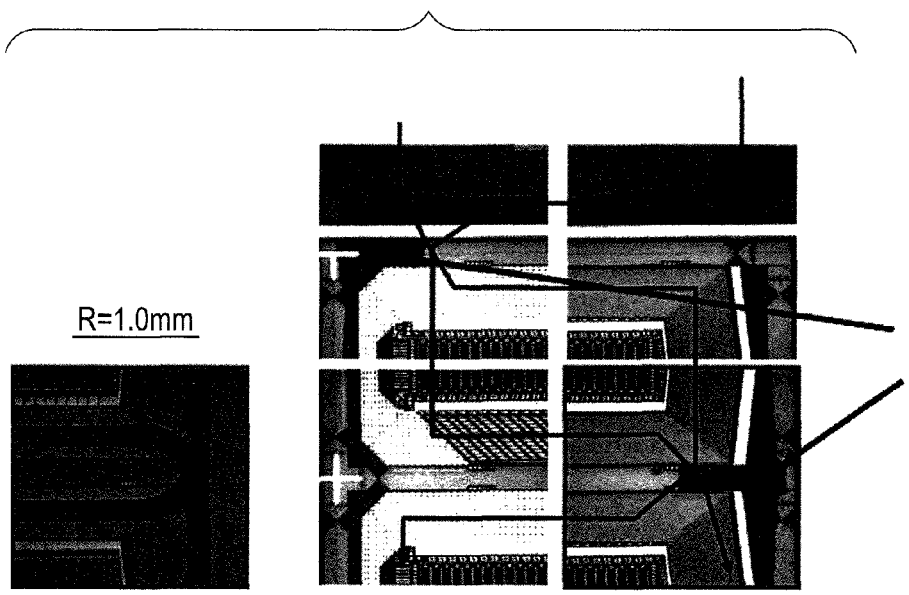
FIG. 3 is a drawing showing a crossing seal portion having a small radius of curvature.
Figures 4, 5:
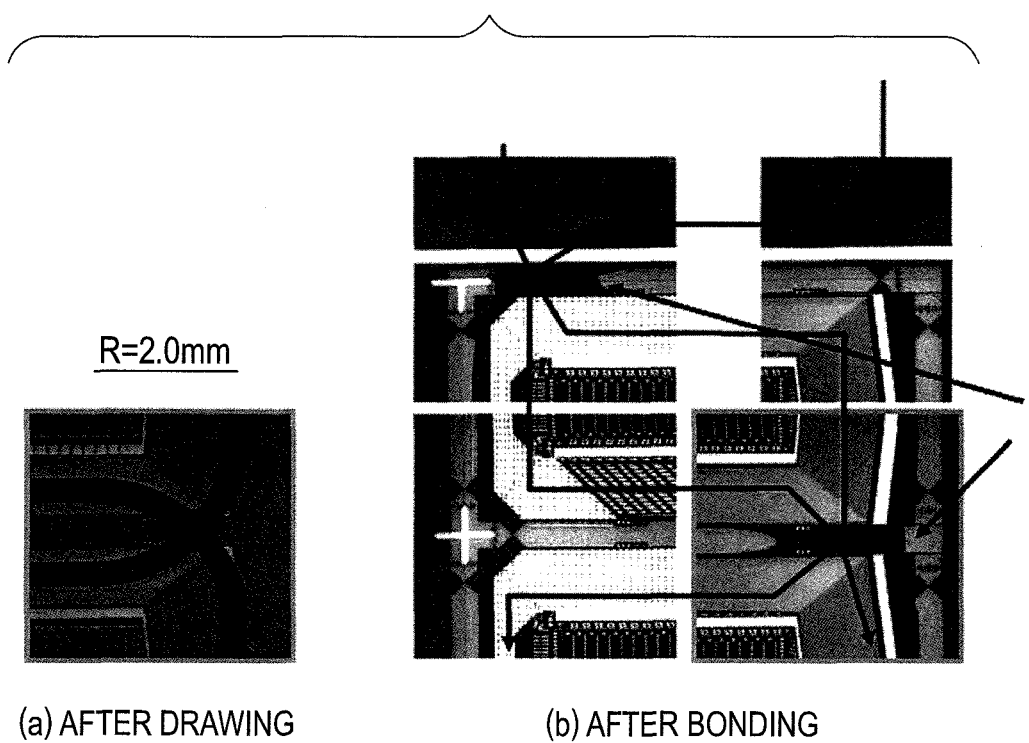
FIG. 4 is a drawing showing a crossing seal portion having a large radius of curvature.
FIG. 5 is a plan view of the entire seal after bonding a counter substrate.

FIG. 3 shows shapes of the pattern when the radius of curvature R of the crossing seal portion is 1.0 mm. FIG. 3 on the left represents the shape after drawing the pattern, and FIG. 3 on the right represents the shape after bonding the counter substrate. As shown by arrows, the seal extends to the cutting area after bonding. For this reason, when the substrate is cut, the seal may be interfered with. FIG. 4 shows shapes of the pattern when the radius of curvature R of the crossing seal portion is 2.0 mm. FIG. 4 on the left represents the shape after drawing the pattern, and FIG. 4 on the right represents the shape after bonding the counter substrate. As shown by arrows, an increase in the radius of curvature R allows the crossing seal portion to be formed inside the cutting area. Thus, interference between the seal and the cut line after bonding can be avoided. The radius of curvature R of the non-crossing seal portion is 0.5 mm in both FIGS. 3 and 4.

In the seal pattern of FIG. 2, the crossing seal portions where the sealant is applied in an overlapping manner have a larger radius of curvature, R2, so as not to extend off the product when bonding the counter substrate. As for the non-crossing portions 23 of the seal, there is no need to consider extending off thereof. Thus, the non-crossing portions 23 have a smaller radius of curvature, R1, so that the seal travels along the long side and short side of the liquid crystal display device and so that R1<R2. According to the embodiment of the present invention, setting R2 as being larger than R1 can prevent the crossing portions from extending off when bonding the counter substrate, as well as allows the non-crossing portions to travel along the sides of the liquid crystal display device.

Figure 6A:
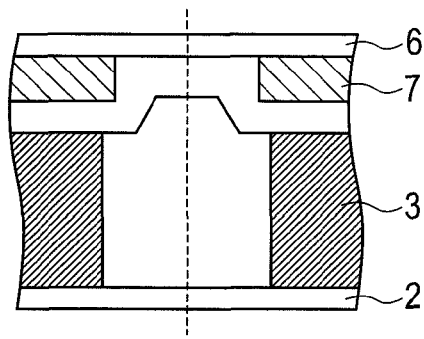
FIG. 6A is an enlarged sectional view of a non-crossing portion of the seal of FIG. 5.
Figure 6B:
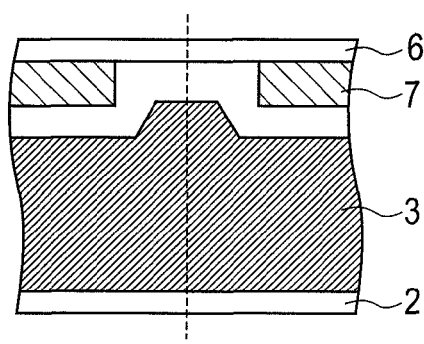
FIG. 6B is an enlarged sectional view of a crossing portion of the seal of FIG. 5.
Figure 6C:
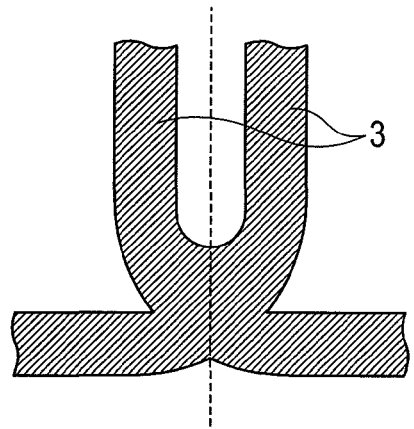
FIG. 6C is an enlarged plan view of the crossing portion of the seal of FIG. 5.

FIG. 5 is a plan view of the entire seal after bonding the counter substrate. The seal has the crossing portions 22 and the non-crossing portions 23 at the boundaries between the liquid crystal display devices. In relation to FIG. 5, FIG. 6A represents an enlarged sectional view of a non-crossing portion 23 of the seal, FIG. 6B an enlarged sectional view of a crossing portion 22 of the seal, and FIG. 6C an enlarged plan view of a crossing portion 22 of the seal. In the drawings, numeral 2 represents a mother glass substrate, numeral 3 the sealant, numeral 6 a counter substrate, and numeral 7 a black matrix. As seen in FIG. 6B, the sealant 3 swells at the crossing portion 22. As seen in FIG. 6C, when the sealant 3 is pressed by the counter substrate, the width thereof is increased.

Figure 7A:
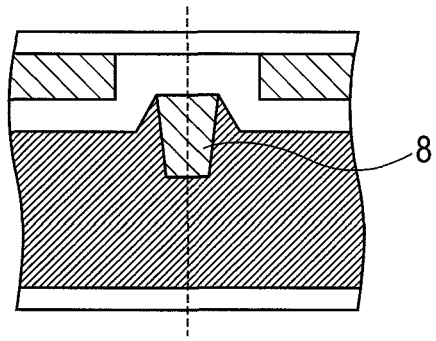
FIG. 7A is an enlarged sectional view showing another form of a crossing portion of a seal.
Figure 7B:
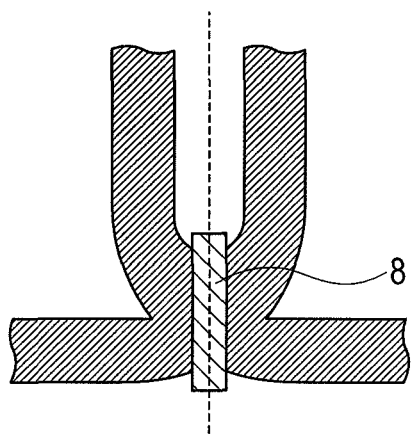
FIG. 7B is an enlarged sectional view showing another form of a crossing portion of a seal.
Figure 7C:
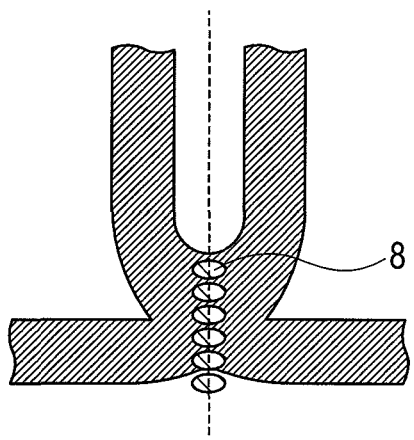
FIG. 7C is an enlarged sectional view of a crossing portion of a seal using another spacer.
Figure 8:
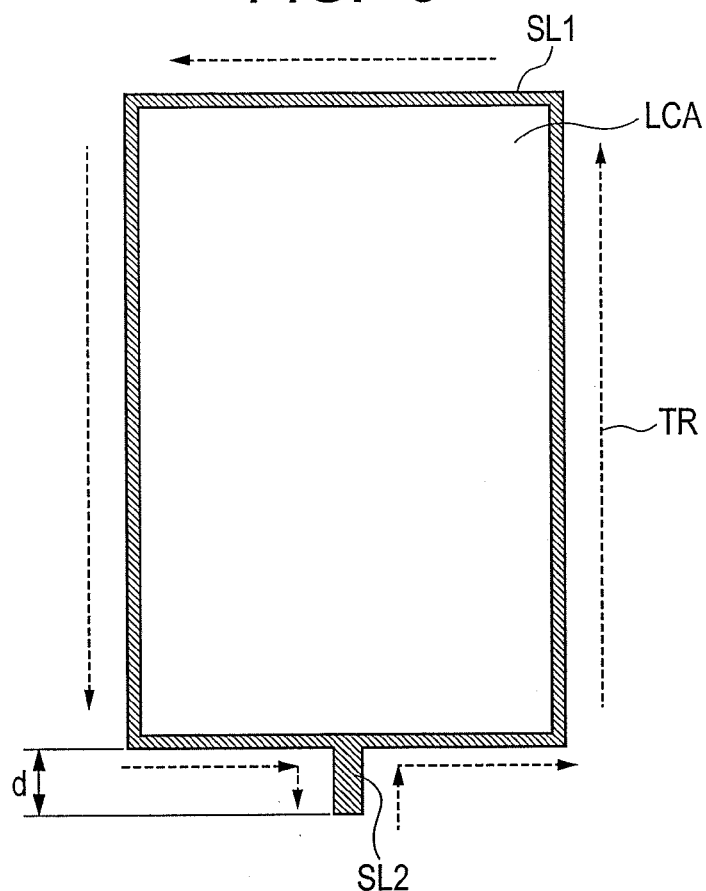
FIG. 8 is a plan view showing an example of a conventional sealant application pattern.

FIGS. 7A to 7C show other forms of a crossing portion 22. FIG. 7A represents an enlarged sectional view of a crossing portion 22 of the seal, FIG. 7B an enlarged plan view of a crossing portion 22 of the seal, and FIG. 7C an enlarged plan view of a crossing portion 22 of the seal using another spacer. In these examples, a spacer 8 is disposed at the crossing portion 22 of the seal. FIGS. 7A and 7B show examples where a rectangular parallelepiped-shaped spacer is disposed, and FIG. 7C shows an example where multiple cylindrical spacers are disposed. The spacer 8 is made of, e.g., an acrylic resin. The disposition of the spacer at the crossing portion 22 facilitates cutting-out of liquid crystal display devices.

What is claimed is:

1. In a method for manufacturing a liquid crystal display device by applying a sealant using a dispenser to form a plurality of seal patterns on a first substrate in a matrix, dropping liquid crystal, bonding a second substrate to the first substrate, and then cutting the bonded first and second substrates into individual cut liquid crystal display devices, a process of forming the seal patterns in a matrix comprising:
    a first step of sequentially applying the sealant as a first seal pattern to one long side and one short side out of four sides of the seal pattern of each to be cut liquid crystal display device with a single stroke; and
    a second step of sequentially applying the sealant as a second seal pattern to the remaining long side and the remaining short side out of the four sides of the seal pattern of each to be cut liquid crystal display device with a single stroke;
    wherein the sealant is applied so that the sealant of the first seal pattern applied in the first step and the sealant of the second seal pattern applied in the second step both cross each other and do not cross each other with curved parts at a common boundary between adjacent to be cut liquid crystal display devices, and
    a radius of curvature R2 of each of the curved parts of the seal patterns adjacent to a crossing portion where the first seal pattern applied by the first step and the second seal pattern applied by the second step cross each other of the common boundary is larger than a radius of curvature R1 of each of the curved parts of the seal patterns adjacent to a non-crossing portion where the first and second seal patterns do not cross each other at the common boundary, and the relationship of the radius of curvature R2 >R1 at the common boundary between the adjacent to be cut liquid crystal display devices prevents each of the seal patterns of the crossing portions from extending to a cutting area after bonding the second substrate to the first substrate.

2. The method for manufacturing a liquid crystal display device according to claim 1, wherein the crossing portion and the non-crossing portion are located on at least one side of the to be cut liquid crystal display device.

3. In a liquid crystal display device manufactured by applying a sealant using a dispenser to form a plurality of seal patterns on a first substrate in a matrix, dropping liquid crystal, bonding a second substrate to the first substrate, and then cutting the bonded first and second substrates into individual cut liquid crystal display devices, the seal patterns on the first substrate comprising:
    a first seal pattern formed by sequentially applying the sealant to one long side and one short side out of four sides of the seal pattern of each to be cut liquid crystal display device with a single stroke; and
    a second seal pattern formed by sequentially applying the sealant to the remaining long side and the remaining short side out of the four sides of the seal pattern of each to be cut liquid crystal display device with a single stroke, wherein
    the first seal pattern and the second seal pattern both cross each other and do not cross each other at a common boundary between adjacent to be cut liquid crystal display devices; and
    a radius of curvature R2 of each of the seal patterns adjacent to a crossing portion where the first seal pattern and the second seal pattern cross each other at the common boundary is larger than a radius of curvature R1 of each of the seal patterns adjacent to a non-crossing portion where the first and second seal patterns do not cross each other at the common boundary, and the relationship of the radius of curvature R2 >R1 at the common boundary between the adjacent to be cut liquid crystal display devices prevents each of the seal patterns of the crossing portions from extending to the cutting area after bonding the second substrate to the first substrate.

4. The liquid crystal display device according to claim 3, wherein the crossing portion and the non-crossing portion are located on at least one cut side of the cut liquid crystal display devices.

5. The liquid crystal display device according to claim 3, wherein a spacer is disposed at a crossing portion where the first and second seal patterns cross each other.

6. The liquid crystal display device according to claim 5, wherein the spacer disposed at the crossing portion is in the shape of a rectangular parallelepiped.

7. The liquid crystal display device according to claim 5, wherein the spacer disposed at the crossing portion comprises a plurality of arranged cylindrical spacers.

8. The method for manufacturing a liquid crystal display device according to claim 1, wherein the cut liquid crystal display device cut from the bonded first and second substrates has at least two cut sides.

9. The method for manufacturing a liquid crystal display device according to claim 8, wherein the liquid crystal display device cut from the bonded first and second substrates has four cut sides.

10. The liquid crystal display device according to claim 3, wherein the cut liquid crystal display device cut from the bonded first and second substrates has at least two cut sides.

11. The liquid crystal display device according to claim 10, wherein the liquid crystal display device cut from the bonded first and second substrates has four cut sides.

\* \* \* \* \*